W. BARBER.
MOTOR VEHICLE.
APPLICATION FILED AUG. 8, 1913.
1,153,536.
Patented Sept. 14, 1915.
2 SHEETS—SHEET 1.
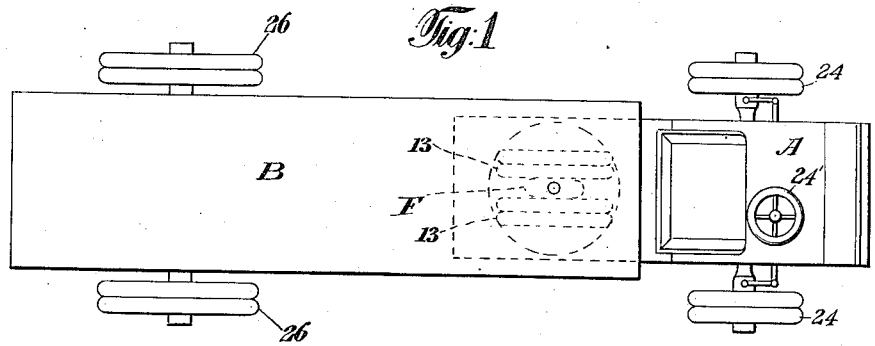
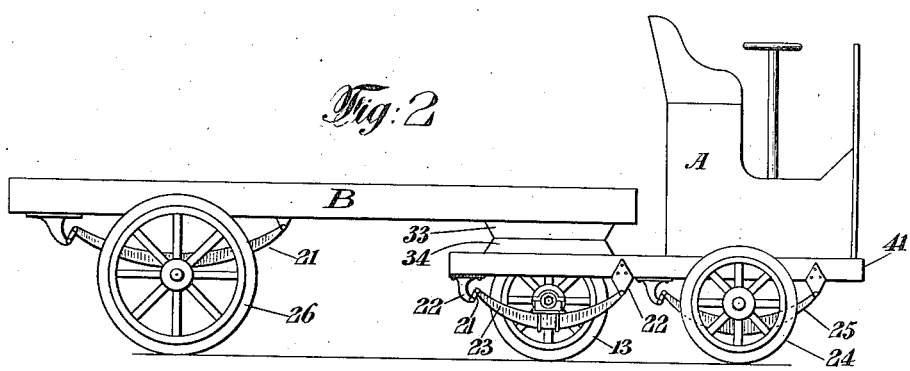
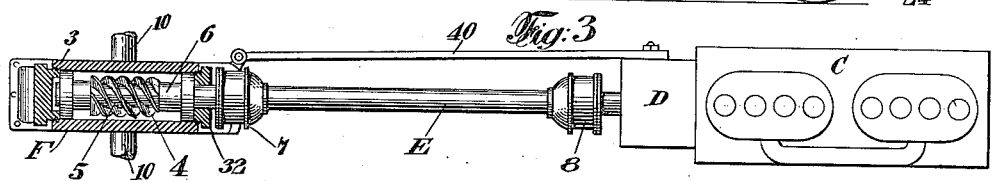
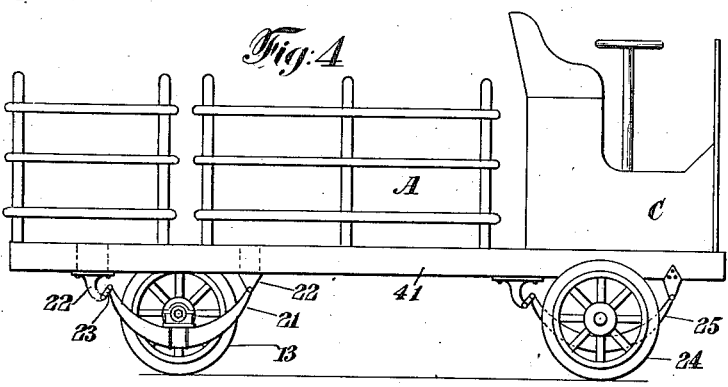
Witnesses:
John E. Prager
A. Worden Gibbs
William Barber Inventor
By his Attorney

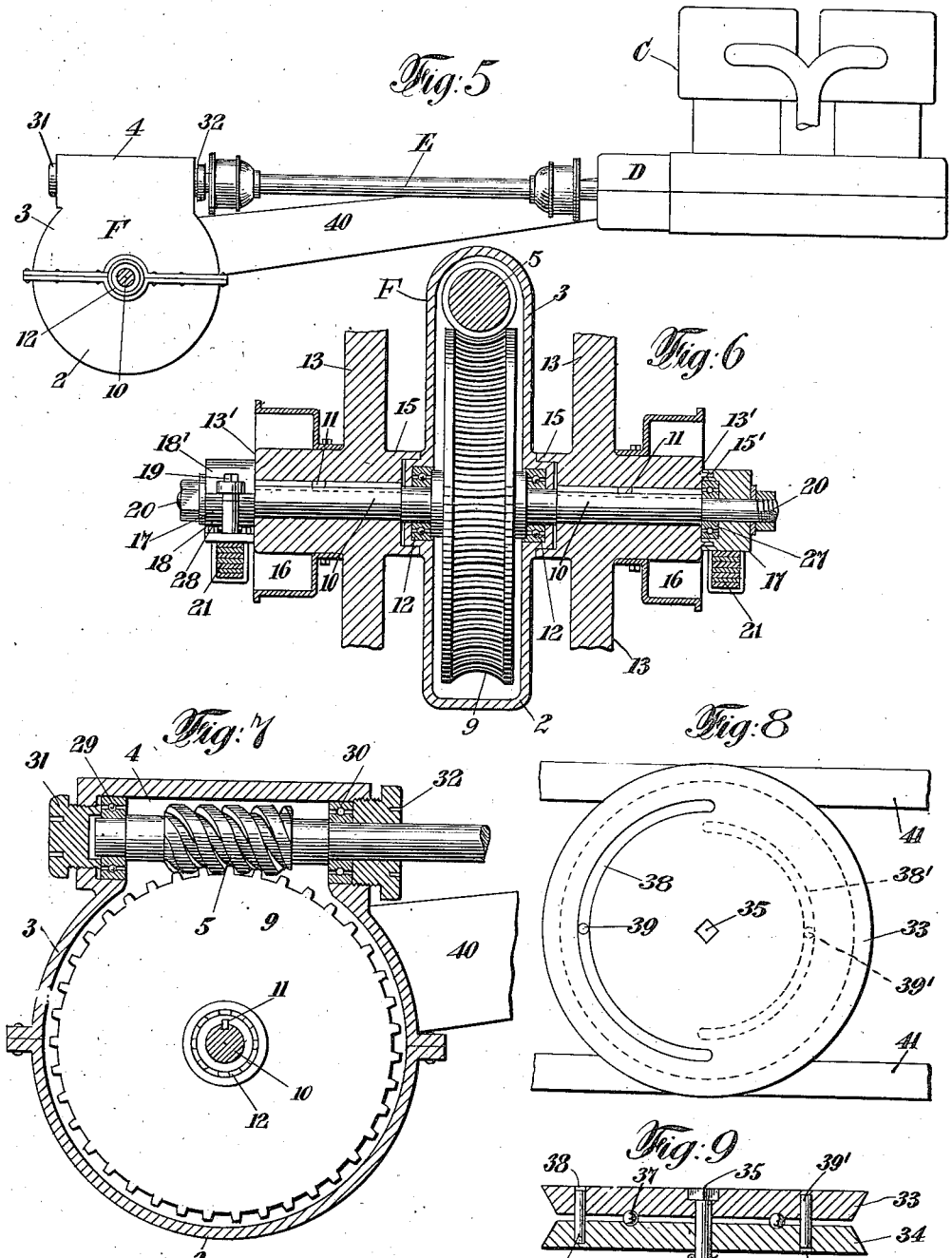

UNITED STATES PATENT OFFICE.

WILLIAM BARBER, OF BROOKLYN, NEW YORK.

MOTOR-VEHICLE.

1,153,536.   Specification of Letters Patent.   Patented Sept. 14, 1915.

Application filed August 8, 1913.   Serial No. 783,744.

*To all whom it may concern:*

Be it known that I, WILLIAM BARBER, a citizen of the United States, residing at the borough of Brooklyn, in the county of Kings, in the city and State of New York, United States of America, have invented certain new and useful Improvements in Motor-Vehicles, of which the following is a specification.

The object of my invention is to provide a motor actuated vehicle with great tractive power, in which road vibration through the traction wheels, and also liability of skidding when turning, is in each case reduced to a minimum; which motor vehicle may be used alone as a vehicle for any purpose, and with but slight change in construction, may be adapted to be used as a motor-tractor for use in hauling freighting trailers, agricultural implements, etc., in all cases where such tractors are of use. Such device of the new and improved form of my invention herein disclosed and claimed, is of extreme simplicity of construction, of little comparative weight, and of few mechanical parts; and consequently of little liability to wear through use, or to deteriorate through age.

To such ends my invention consists in substance and broadly, in securing two traction-wheels upon a single piece axle closely adjacent to one another in such manner as to rotate with such axle, and to affix to the axle between such traction-wheels a suitable driving gear-wheel, which is rotated by the motor through suitable intervening driving mechanism; such axle rotating in suitable bearings or journal boxes supported by the gear-wheel housing; and in like bearings or journal-boxes carried by the vehicle side-springs, secured thereto within the central bow portions, so as to support the axle at either end; and when to be used as a motor-tractor, I include in the construction in most cases, and where to be used for freight carrying trailers, a new and improved form of fifth-wheel forming the connection between them, wherein the traverse of the tractor beneath the trailer is limited, and friction is reduced.

My said invention is fully shown and described in the following specification, of which the accompanying drawings form a part, wherein similar letters or numerals of reference designate like or equivalent parts wherever found throughout the several views, and in which:—

Figure 1 is a top-plan view of such invention, in the form of a motor-tractor attached to a two-wheeled freight trailer; and Fig. 2 is a side view of the construction shown in Fig. 1. Fig. 3 is a top-plan view of my improved form of traction driving mechanism used, taken partially in horizontal section in order to more fully show the construction. Fig. 4 is a view of my invention from the side, similar to Fig. 2, in the form of a freight carrying truck complete within itself and without a trailer. Fig. 5 is a side view in elevation of the mechanism shown in top-view in Fig. 3. Fig. 6 is a front view in detail, mostly in central vertical cross-section of the driving-gear wheel, driving-axle, traction-wheel hubs, etc., showing the particular manner in which the same are constructed and placed in the practical embodiment of my invention. Fig. 7 is a side-view, partially in central vertical cross-section of the axle driving-gear and its housing, looking from the left of Fig. 6; and Figs. 8 and 9, are respectively, detail top-plan, and side central vertical cross-sectional views, of the improved form of fifth-wheel or connecting mechanism, I prefer to use in the tractor-trailer form of embodiment of my invention, for forming the horizontally traversable connection between them.

Referring to the drawings: The reference letter A designates a tractor of my improved form (Figs. 1 and 2), attached to a two-wheeled freight carrying trailer B, by means of the fifth-wheel formed of the plates 33 and 34, rigidly secured in any desired manner to A and B respectively; whereby as will be seen, such trailer and tractor together form a six-wheeled vehicle, the two front wheels of which are of the knuckle-joint axle well known form, for purposes of steering; such wheels 24 being connected with the usual hand steering-wheel 24' by any suitable gearing. And while I prefer this construction, it is evident that the relative positions of the traction-wheels 13 and steering-wheels 24 (especially in the complete vehicle non-tractor form of construction shown in Fig. 4) may be changed and the former placed in front of the latter, without departing from the broad scope of my invention.

While any suitable motor may be used, I prefer to use what is known as a unit-motor (indicated by C in Figs. 3 and 5) having located within the same housing a change-speed and reversing-gear D, the power being transmitted to the driving-axle 10 through the universally jointed main or drive-shaft E, the joint 7 being in actuating connection with the shaft 6 formed integral with or secured to the endless-screw 5, of the driving-gear F, which meshes with the endless-screw gear-wheel 9, rigidly secured upon the single-piece live driving-axle 10, in any desired manner, usually by means of a suitable key 11, so that they will rotate in unison.

The driving-gear composed of the screw 5 and wheel 9, is inclosed in a suitable housing composed of a lower part 2, and an upper part 3 having at its upper-side the endless-screw chamber 4; such parts 2 and 3 being provided with abutting flanges for securing the same together by means of suitable screw-bolts (Figs. 5 and 7).

As shown in Figs. 3 and 7, the endless-screw shaft 6 is provided with suitable shoulders against which respectively abut the rear roller-bearing 29 and the forward like bearing 30, mounted in suitable end chambers formed in the endless-screw chamber 4 of the housing; such bearings being held in proper adjustment by a thrust-block screw-plug 31, and a gland-plug 32, each provided with spanner holes.

The endless-screw gear-wheel 9 is usually provided with short hub-flanges (Fig. 6) which abut against suitable roller-bearings 12, located in suitable chambers formed in the two-part housing, and through such bearings passes the single-piece live driving-axle 10, which is rigidly secured to the hubs 13' of the two traction-wheels 13, usually by means of suitable keys 11; and one of the essential points of my invention is that such traction-wheels should be in as close abutment to the housing of the driving-gear, as it is possible to place them, with due regard for proper structural strength and actuation.

The one piece live driving-axle 10 is revolubly supported at the ends in suitable journal-boxes 17, through the medium of roller-bearings 27, located therein and similar to the housing bearings 12, which journal-boxes usually consist of an upper part 18' and a lower part 18, secured together by suitable screw-bolts 19. The part 18 is provided with end flanges projecting to the front and rear, through holes in which pass the upper threaded ends of the spring-securing clips 28, secured in place by suitable nuts above the flange (there being two of such clips to each journal-box) within each of which clips is tightly secured to the journal-box underneath the same, the central bow portion of a side leaf-spring of the well known form as shown at 21, which springs are secured to the side-pieces 41 of the main-frame or chassis of the tractor or vehicle, usually by means of links 23 and supports 22, in the well known manner.

The traction-wheel hubs 13' are preferably provided with suitable annular dust-flanges 15' to keep dust out of the bearings; and suitable end nuts and washers 20 are secured at the axle ends to hold the same against side-slip. Forward springs 25, and in the trailer rear-springs 21' are also usually provided, substantially similar to the springs 21.

When to be used as a trailer tractor, my improved motor-vehicle has mounted thereon at the rear and firmly secured to the chassis or main-frame 41, the lower-plate 34 of a suitable horizontal fifth-wheel, co-acting with the like upper-plate 33 secured to the trailer frame at the forward end as shown. (Figs. 2, 8 and 9). The two plates are secured together by a central king-bolt 35, normally locked by a cotter-pin 36, and to lessen friction are usually provided with the ball-bearing indicated at 37 of Fig. 9. To limit the horizontal traverse of the tractor beneath the trailer in turning, etc., the upper plate 33 is provided with a substantially semi-circular slot 38, in which works the pin 39 rigidly secured to the lower-plate 34, while the lower plate 34 is provided with a similar slot 38', which is however cut upon the line of a smaller circle (Figs. 8 and 9), in which slot 38', works the pin 39' rigidly secured in the upper-plate 33; and by this construction it will be seen that the swing or traverse of the tractor beneath the trailer in turning, will be limited by the co-action of such pins and slots, to substantially a quarter turn to the right or left.

To strengthen the construction a torsion-strut 40, is provided which is secured at one end to the housing of the driving-gear F and at the other connected with the main-frame or chassis, usually by being bolted to the motor-housing; and the traction-wheels are of course usually provided with brake-drums 16, firmly bolted to the hubs.

By the particular form of construction herein shown (which is only one of the many forms in which the invention herein set forth and claimed may in practice be embodied) while the full tractive power of two-wheels is maintained, road vibration exerted upon the vehicle through the two traction-wheels is reduced to a minimum by reason of their nearness to each other, as is also the liability of such traction-wheels skidding on turns; and while I have shown the wheels with grooved or double-tread tires, any other form may be used; and while I have shown an endless-screw form of driving-gear located between the two traction-wheels for driving purposes, any other suitable form of power transmission gearing may be substituted therefor; and many other changes and modifications in construction may be made without departing from the scope of my invention.

I claim:—

1. In a motor vehicle, in combination, a frame, normal gage steering wheels, a traction axle mounted on the frame, closely adjacent narrow gage traction wheels rigidly mounted on said axle adapted to rotate in unison, a motor, power transmitting mechanism connecting said motor with said axle, and means associated with the upper part of said frame adapted to permit a trailer to be removably secured thereto and limit the horizontal traverse of the vehicle with respect to the trailer.

2. In a motor vehicle, in combination, normal gage front steering wheels, a single piece traction axle supported at its ends, narrow gage traction wheels fast on said axle to rotate in unison therewith, a drive gear mounted on the axle between the narrow gage traction wheels and independently connected to rotate with said axle, a motor and mechanism forming an actuating connection between the motor and said drive gear.

3. In a motor vehicle, in combination, normal gage front steering wheels, a single piece traction axle supported at its ends, narrow gage traction wheels mounted on said axle to rotate in unison therewith, a motor, a gear wheel secured to the traction axle between said wheels, and a power transmitting mechanism between said gear wheel and motor.

4. In a motor vehicle, in combination, normal gage front steering wheels, a single piece traction axle supported at its ends, narrow gage traction wheels fast on said axle to rotate in unison therewith, a motor, a gear for rotating the traction axle, said gear secured to said axle between and independently of the traction wheels, a change speed and reversing gear mechanism for the motor, and power transmitting mechanism between said change speed and reversing gear and the gear for rotating the traction axle.

5. In a motor vehicle, in combination, normal gage front steering wheels, a single piece traction axle supported at its ends, narrow gage traction wheels fast on said axle to rotate in unison therewith, a motor, means secured to the axle and located between the two traction wheels to rotate said axle, mechanism forming an actuating connection between said means and the motor, a housing, and bearings for the axle carried by the housing.

6. In a motor vehicle, in combination, normal gage front steering wheels, a single piece traction axle supported at its ends, narrow gage traction wheels fast on said axle to rotate in unison therewith, a motor, a gear wheel for rotating the axle, said gear wheel secured to the axle between and independently of the traction wheels, power transmitting mechanism between said axle-gear wheel and the motor, a two part housing for the gearing split longitudinally upon the axial line of the axle, and anti-friction bearings for the axle supported by the housing.

7. In a motor vehicle, in combination, normal gage front steering wheels, a single piece traction axle supported at its ends, narrow gage traction wheels fast on said axle to rotate in unison therewith, a motor, a gear wheel for rotating the axle, said gear wheel secured to the axle between and independently of the traction wheels, power transmitting mechanism between said gear wheels and motor and means for longitudinally adjusting a portion of said power transmitting mechanism relatively to another portion thereof.

8. In a motor vehicle, in combination, a frame, a traction axle mounted on the frame, closely adjacent independently removable narrow gage traction wheels mounted on said axle and connected thereto to rotate in unison therewith, a drive gear independent of the traction wheels and also mounted on said axle to rotate therewith, a motor, and power transmitting mechanism connecting the motor and drive gear.

Signed in the county, city and State of New York, this seventh day of August, nineteen hundred and thirteen.

WILLIAM BARBER.

Witnesses:
RICHARD O. SMITH,
WILLIAM WAGNER.